Nov. 12, 1963  J. E. CIRCLE, JR  3,110,474
SUPPORT BLOCK ASSEMBLY
Filed July 31, 1962
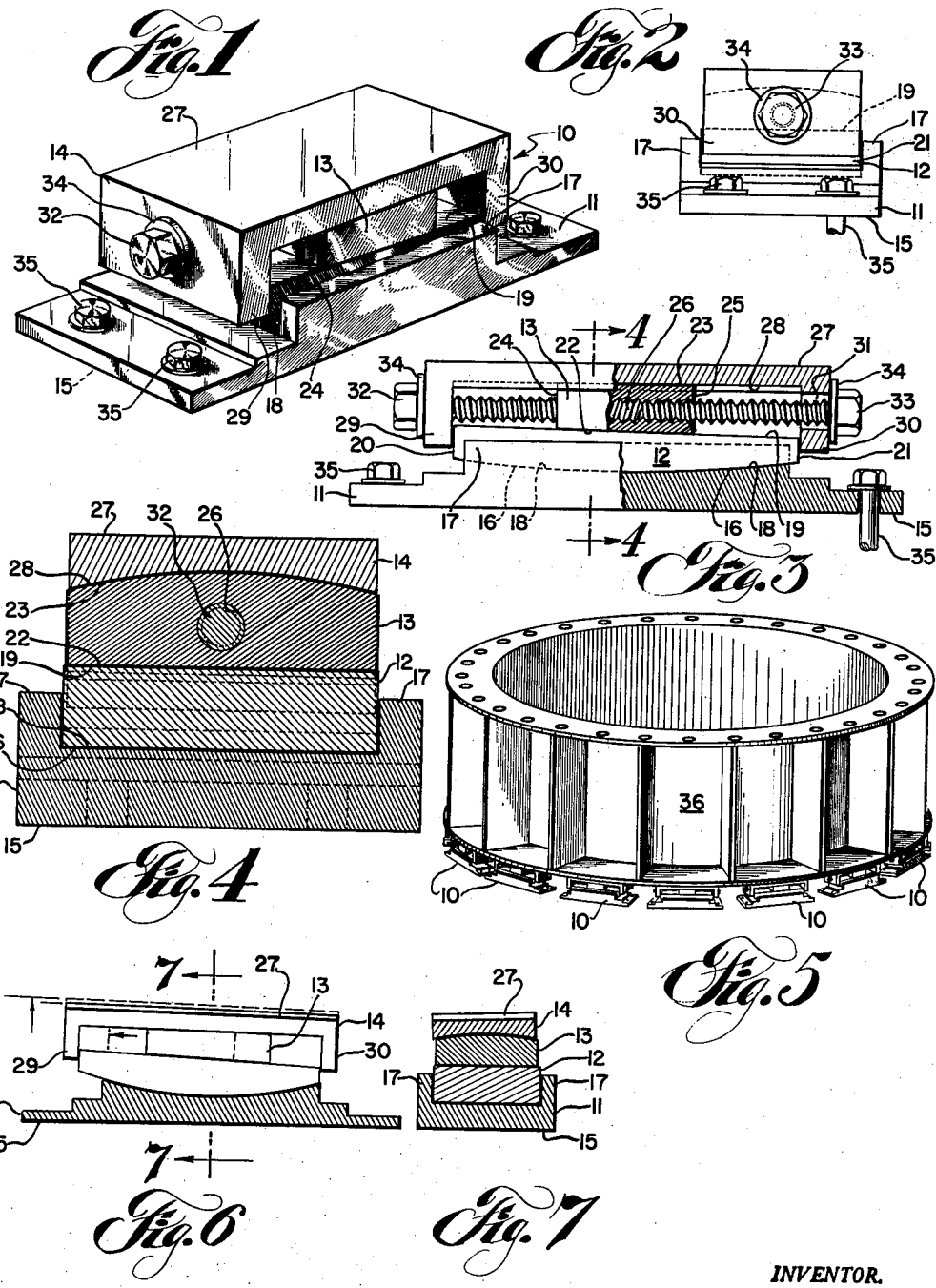
INVENTOR.
JOHN E. CIRCLE, JR.
BY
ATTORNEY United States Patent Office 3,110,474
Patented Nov. 12, 1963

3,110,474
SUPPORT BLOCK ASSEMBLY
John E. Circle, Jr., Worthington, Ohio, assignor to North American Aviation, Inc.
Filed July 31, 1962, Ser. No. 213,791
3 Claims. (Cl. 254—104)

This invention generally relates to a support device and particularly concerns a support block assembly having a novel construction to effect important manufacturing advantages.

The primary objects of this invention are to provide a support block assembly which has a capability for effecting support compensation as between non-parallel load and support surfaces, which has features for effecting precision adjustments to the height of a supported load, and which is especially well-suited to supporting heavy loads.

The support block assembly of this invention utilizes pairs of cylindrical surfaces positioned at right angles to thereby obtain a support compensation capability as between non-parallel load and support surfaces. Because this invention avoids the use of mated spherical surfaces to develop the compensation capability, important manufacturing savings and advantages may be realized. A wedge member located intermediate and comprising a part of the paired cylindrical surfaces is provided to develop the precision height adjustment capability.

In the drawings:

FIG. 1 is a perspective view of a preferred embodiment of the support block assembly of this invention;

FIG. 2 is an end elevational view of the support block assembly illustrated in FIG. 1;

FIG. 3 is a side elevational view of the support block assembly illustrated in FIG. 1;

FIG. 4 is a sectional view taken at line 4—4 of FIG. 3;

FIG. 5 illustrates the application of this invention to an antenna system bearing support block assembly requirement;

FIG. 6 is a schematic elevational view illustrating the operating characteristics of this invention in exaggerated form; and FIG. 7 is a schematic sectional view taken at line 7—7 of FIG. 6.

A preferred embodiment of the support block assembly of this invention is designated generally as 10 in the drawings. Assembly 10 is comprised of a base member 11, a lower rocker 12 carried upon base 11, a wedge 13 carried upon lower rocker 12, and an upper rocker 14 carried upon wedge 13. Base member 11 has an underside surface 15 which is, in most applications, preferably flat. Base member 11 is also provided with a cylindrical surface 16 at its upper side. Surface 16 is concave and is positioned such that its axis of curvature or rotation is positioned generally transverse to the length of base 11. Base member 11 is also provided with guides 17 for restricting movement of lower rocker 12 in directions parallel to the axis of curvature of cylindrical surface 16. Manufacturing advantages may be realized if guides 17 are made separate from, rather than integral with, base 11 and attached thereto with suitable fasteners.

Lower rocker 12 is provided with a cylindrical surface 18 which cooperates and is paired with cylindrical surface 16 of base member 11. Surface 18 is illustrated as being convex, matches surface 16 in contour, and has the same axis of curvature and radius as surface 16 when members 11 and 12 are mated. Lower rocker 12 also is provided with a flat upper surface 19 which constitutes an inclined plane as between ends 20 and 21. Rocker 12 may also be considered to have a taper as between its illustrated end portions 20 and 21.

Wedge 13 is provided with a surface 22 which is flat and which cooperates with surface 19 of lower rocker 12. As shown best in FIG. 4, wedge 13 is also provided with a cylindrical surface designated 23 at its upper side. Surface 23 is provided with an axis of curvature positioned at right angles to the axis of curvature for surfaces 16 and 18. Wedge 13 is tapered intermediate its end portions 24 and 25. The taper preferably corresponds to the taper provided in the inclined plane surface 19 of lower rocker 12. Wedge 13 is also provided with the threaded opening 26 which cooperates with the hereinafter-mentioned advancing screws.

Upper rocker 14 is provided with a flat support surface 27 which cooperates with the lower or under surface of the structural member, such as antenna base 36 of FIG. 5, which is to be supported by support block assembly 10. Rocker 14 is also provided with a cylindrical sliding surface 28 which cooperates and is paired with the cylindrical sliding surface 23 of wedge block 13. The plane of surface 27 is preferably parallel to the axis of curvature of cylindrical surface 28. Surface 28 is illustrated as being concave, corresponds to surface 23 in contour, and has the same axis of curvature and surface radius as does cylindrical surface 23. Upper pivot block 14 is also provided with integral end plates 29 and 30 to restrict movement of upper pivot block 14 relative to lower pivot block 12 in directions parallel to the axis of curvature of cylindrical surfaces 23, 28. For this purpose, end plates 29 and 30 each project downwardly and over ends 20 and 21 of block 12. Each end plate portion 29 or 30 is provided with a slotted opening 31 which receives an assembly advancing screw. As in the case of guides 17, manufacturing advantages may be realized if ends 29 and 30 are made separate from, rather than integral with, rocker 14 and afterwards attached thereto with suitable fastener devices.

Advancing screws 32 and 33 cooperate with the threaded opening 26 in wedge 13 and with the openings 31 provided in the ends of upper rocker 14. Washer components 34 cooperate with the heads of advancing screws 32 and 33 to restrict movement of the screw through opening 31 as the position of wedge 13 is being changed. Fasteners 35 are provided to attach assembly 10 to a support.

FIGS. 6 and 7 illustrate the operating characteristics of support block assembly 10 in an exaggerated manner. The figures clearly illustrate the non-parallel relationship which may be developed as between surface 27 of upper rocker member 14 and surface 15 at the underside of base member 11 during use of the invention. Surface 27 normally becomes coextensive with the under surface of the load supported by assembly 10. Surface 15 is normally coextensive with the surface of the support which ultimately carries the load upon support block 10. In FIG. 6, wedge 13 is illustrated in an initial position by solid lines. When wedge 13 is moved by adjustment of advancing screws 32 and 33 to its dotted line position (FIG. 6, also), the upper surface 27 of rocker member 14 is moved to its correspondingly illustrated dotted line position. Movement of wedge 13 thereby permits precision height adjustment as to the position of surface 27. During such adjustment, surface 27 remains substantially parallel to its original loaded orientation. Also, significant manufacturing advantages may be realized through the manufacture of a support block having the disclosed construction. Important machining savings may be effected if paired cylindrical support surfaces are provided in preference to mated spherical surfaces.

Support block assemblies having the features of this invention have been successfully utilized to support the base of a rotatable large-diameter precision antenna having a gross weight approaching 200,000 pounds and to provide precision height adjustment for leveling such base. The antenna base had a form similar to the member designated 36 in FIG. 5. A taper was provided in components 12 and 13 of the assemblies to develop approximately 0.030" of height adjustment for approximately 3" longitudinal movement of wedge 13.

I claim:

1. In a support block assembly which serves to transmit load forces from a load surface to a support surface, in combination:
   (a) a base having a first surface for contacting said support surface and having a cylindrical sliding surface opposite said first surface,
   (b) a first rocker having a cylindrical sliding surface conforming to and contacting said base cylindrical sliding surface and having an inclined plane surface opposite said first rocker cylindrical sliding surface,
   (c) a wedge having a surface contacting said first rocker member inclined plane surface and having a separate cylindrical sliding surface with an axis of curvature positioned at right angles to the axis of curvature of said base cylindrical sliding surface, and
   (d) a second rocker having a cylindrical sliding surface conforming to and contacting said wedge cylindrical sliding surface and having a second surface opposite said second rocker cylindrical sliding surface for contacting said load surface.

2. The invention defined by claim 1, wherein a threaded advancing means is provided for moving said wedge relative to said rockers, said threaded advancing means having a longitudinal axis oriented parallel to the axis of curvature of said second rocker cylindrical sliding surface.

3. The invention defined by claim 1, wherein a threaded advancing means is provided for moving said wedge relative to said rockers, said threaded advancing means being restrained against movement in a direction parallel to the direction of movement of said wedge by reaction forces developed as between said rockers.

References Cited in the file of this patent

UNITED STATES PATENTS 258,558  Cook ------------------ May 30, 1882